United States Patent
Rost et al.

(10) Patent No.: US 11,943,145 B2
(45) Date of Patent: Mar. 26, 2024

(54) APPARATUS, METHOD, AND COMPUTER PROGRAM FOR DETERMINING TIME SENSITIVE COMMUNICATION ASSISTANCE INFORMATION IN A MOBILE COMMUNICATION SYSTEM

(71) Applicant: NOKIA SOLUTIONS AND NETWORKS OY, Espoo (FI)

(72) Inventors: Peter Rost, Heidelberg (DE); Borislava Gajic, Unterhaching (DE); Christian Mannweiler, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/622,571

(22) PCT Filed: Jun. 24, 2019

(86) PCT No.: PCT/EP2019/066639
§ 371 (c)(1),
(2) Date: Dec. 23, 2021

(87) PCT Pub. No.: WO2020/259793
PCT Pub. Date: Dec. 30, 2020

(65) Prior Publication Data
US 2022/0255871 A1    Aug. 11, 2022

(51) Int. Cl.
*H04L 47/2491* (2022.01)
*H04L 47/28* (2022.01)

(52) U.S. Cl.
CPC .......... *H04L 47/2491* (2013.01); *H04L 47/28* (2013.01)

(58) Field of Classification Search
None
See application file for complete search history.

(56) References Cited

U.S. PATENT DOCUMENTS 11,546,805 B2 *   1/2023   Prabhakar ........... H04L 43/0852

OTHER PUBLICATIONS

"3rd Generation Partnership Project; Technical Specification Group Services and System Aspects; System Architecture for the 5G System; Stage 2 (Release 16)", 3GPP TS 23.501 v16.1.0, (Jun. 2019), 368 pages.
"IEEE Standard for Local and Metropolitan Area Networks—Bridges and Bridged Networks—Amendment 28: Per-Stream Filtering and Policing", IEEE Computer Society, IEEE 802.1Qci-2017, (Oct. 6, 2017), 65 pages.
"IEEE Standard for Local and Metropolitan Area Networks—Bridges and Bridged Networks", IEEE Computer Society, IEEE Std 802.1Q-2018, (Jul. 6, 2018), 1993 pages.

(Continued)

*Primary Examiner* — Minh Trang T Nguyen
(74) *Attorney, Agent, or Firm* — ALSTON & BIRD LLP

(57) ABSTRACT

An apparatus comprising: at least one processor; and at least one memory including computer program code; the at least one memory and the computer program code configured to, with the at least one processor, cause the apparatus at least to: identify (702, 704, 706, 708, 710) a stream gate instance associated with a quality of service flow; and determine (712) time sensitive communication assistance information for the quality of service flow based on one or more parameters defining operation of the stream gate instance.

18 Claims, 10 Drawing Sheets

(56) References Cited

OTHER PUBLICATIONS

"IEEE Standard for Local and Metropolitan Area Networks—Bridges and Bridged Networks, Amendment 25: Enhancements for Scheduled Traffic", IEEE Standards Association, IEEE Computer Society, IEEE Std 802.1Qbv-2015, (Mar. 18, 2016), 57 pages.

"Information Technology—Telecommunications and Information Exchange Between Systems—Local and Metropolitan Area Networks—Specific Requirements—Part 1CB: Frame Replication and Elimination for Reliability", International Standard, ISO/IEC/IEEE 802.1CB, (Oct. 27, 2017), 106 pages.

Bello et al., "A Perspective on IEEE Time-Sensitive Networking for Industrial Communication and Automation Systems", Proceedings of the IEEE, vol. 107, Issue 6, (Jun. 2019), 27 pages.

Huawei et al., "Discussion on 5GS Bridge Management and TSN Stream Establishment", 3GPP TSG-SA WG2 Meeting #133, S2-1905675, (May 13-17, 2019), 4 pages.

International Search Report and Written Opinion for Patent Cooperation Treaty Application No. PCT/EP2019/066639.

Levi et al., "Definitions of Managed Objects for Bridges with Traffic Classes, Multicast Filtering, and Virtual LAN Extensions", Network Working Group, Request for Comments: 4363, (Jan. 2006), 99 pages.

ZTE et al., "Resolving the EN on Traffic Pattern to the TT", 3GPP TSG-SA WG2 Meeting #133, S2-1905524, (May 13-17, 2019)k, 4 pages.

ZTE et al., "Resolving the EN on Traffic Pattern to the TT", 3GPP TSG-SA WG2 Meeting #133, S2-1906663, (May 13-17, 2019), 2 pages.

\* cited by examiner

APPARATUS, METHOD, AND COMPUTER PROGRAM FOR DETERMINING TIME SENSITIVE COMMUNICATION ASSISTANCE INFORMATION IN A MOBILE COMMUNICATION SYSTEM

CROSS-REFERENCE TO RELATED APPLICATIONS

This application is a national phase entry of International Application No. PCT/EP2019/066639, filed Jun. 24, 2019, the entire contents of which are incorporated herein by reference.

FIELD OF THE DISCLOSURE

The present disclosure relates to an apparatus, a method, and a computer program for determining time sensitive communication assistance information for a quality of service flow in a mobile communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two devices occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is the Universal Mobile Telecommunications System (UMTS) with UTRAN radio access technology (3G radio). Another example of an architecture that is known as the evolved packet system (EPS) with long-term evolution-advanced (LTE-A) radio access technology (4G radio). Another example communication system is the so called 5G system (5GS) with 5G New Radio (5G NR) radio access technology.

SUMMARY

According to an aspect there is provided an apparatus comprising at least one processor and at least one memory including computer code for one or more programs, the at least one memory and the computer code configured, with the at least one processor, to cause the apparatus at least to: identify a stream gate instance associated with a quality of service flow; and determine time sensitive communication assistance information for the quality of service flow based on one or more parameters defining operation of the stream gate instance.

The one or more parameters defining operation of the stream gate instance associated with the quality of service flow may be stored in a stream filter instance information table.

The one or more parameters defining operation of the stream gate instance may comprise at least one of (i) a parameter defining a sequence with which the stream gate instance is opened and closed and (ii) a parameter defining a periodicity of a cycle of the stream gate instance.

The parameter defining a sequence with which the stream gate instance is opened and closed comprises OperControlList or AdminControlList.

The parameter defining a periodicity of a cycle of the stream gate instance cycle may comprise OperCycleTime or AdminCycleTime.

The time sensitive communication assistance information for the quality of service flow may comprise at least one of a flow direction, a periodicity and a burst arrival time.

Identifying a stream gate instance associated with a quality of service flow may comprise: determining ingress and egress ports of a destination address included in in one or more entries of a filtering database table.

The filtering database table may be provided by a centralized network configuration.

Identifying a stream gate instance associated with a quality of service flow may comprise: determining a stream identifier uniquely identifying a stream associated with the destination address.

Identifying a stream gate instance associated with a quality of service flow may comprise: mapping the stream identifier to the ingress and egress ports.

Identifying a stream gate instance associated with a quality of service flow may comprise: mapping the stream identifier to a stream gate instance identifier; and identifying a stream gate instance uniquely identified by the stream gate instance identifier and associated with a quality of service flow.

The stream may be a time-sensitive networking stream.

The apparatus may be an application function apparatus, a session management function apparatus or a policy control function apparatus.

The at least one memory and the computer program code may be configured to, with the at least one processor, cause the apparatus at least to: send the time sensitive communication assistance information for the quality of service flow to another apparatus.

The other apparatus may be a session management function apparatus or a radio access network function apparatus.

According to an aspect there is provided an apparatus comprising circuitry configured to: identify a stream gate instance associated with a quality of service flow; and determine time sensitive communication assistance information for the quality of service flow based on one or more parameters defining operation of the stream gate instance.

The one or more parameters defining operation of the stream gate instance associated with the quality of service flow may be stored in a stream filter instance information table.

The one or more parameters defining operation of the stream gate instance may comprise at least one of (i) a parameter defining a sequence with which the stream gate instance is opened and closed and (ii) a parameter defining a periodicity of a cycle of the stream gate instance.

The parameter defining a sequence with which the stream gate instance is opened and closed comprises OperControlList or AdminControlList.

The parameter defining a periodicity of a cycle of the stream gate instance cycle may comprise OperCycleTime or AdminCycleTime.

The time sensitive communication assistance information for the quality of service flow may comprise at least one of a flow direction, a periodicity and a burst arrival time.

Identifying a stream gate instance associated with a quality of service flow may comprise: determining ingress and egress ports of a destination address included in in one or more entries of a filtering database table.

The filtering database table may be provided by a centralized network configuration.

Identifying a stream gate instance associated with a quality of service flow may comprise: determining a stream identifier uniquely identifying a stream associated with the destination address.

Identifying a stream gate instance associated with a quality of service flow may comprise: mapping the stream identifier to the ingress and egress ports.

Identifying a stream gate instance associated with a quality of service flow may comprise: mapping the stream identifier to a stream gate instance identifier; and identifying a stream gate instance uniquely identified by the stream gate instance identifier and associated with a quality of service flow.

The stream may be a time-sensitive networking stream.

The apparatus may be an application function apparatus, a session management function apparatus or a policy control function apparatus.

The apparatus may comprise circuitry configured to: send the time sensitive communication assistance information for the quality of service flow to another apparatus.

The other apparatus may be a session management function apparatus or a radio access network function apparatus.

According to an aspect there is provided an apparatus comprising means for: identifying a stream gate instance associated with a quality of service flow; and determining time sensitive communication assistance information for the quality of service flow based on one or more parameters defining operation of the stream gate instance.

The one or more parameters defining operation of the stream gate instance associated with the quality of service flow may be stored in a stream filter instance information table.

The one or more parameters defining operation of the stream gate instance may comprise at least one of (i) a parameter defining a sequence with which the stream gate instance is opened and closed and (ii) a parameter defining a periodicity of a cycle of the stream gate instance.

The parameter defining a sequence with which the stream gate instance is opened and closed comprises OperControlList or AdminControlList.

The parameter defining a periodicity of a cycle of the stream gate instance cycle may comprise OperCycleTime or AdminCycleTime.

The time sensitive communication assistance information for the quality of service flow may comprise at least one of a flow direction, a periodicity and a burst arrival time.

Identifying a stream gate instance associated with a quality of service flow may comprise: determining ingress and egress ports of a destination address included in in one or more entries of a filtering database table.

The filtering database table may be provided by a centralized network configuration.

Identifying a stream gate instance associated with a quality of service flow may comprise: determining a stream identifier uniquely identifying a stream associated with the destination address.

Identifying a stream gate instance associated with a quality of service flow may comprise: mapping the stream identifier to the ingress and egress ports.

Identifying a stream gate instance associated with a quality of service flow may comprise: mapping the stream identifier to a stream gate instance identifier; and identifying a stream gate instance uniquely identified by the stream gate instance identifier and associated with a quality of service flow.

The stream may be a time-sensitive networking stream.

The apparatus may be an application function apparatus, a session management function apparatus or a policy control function apparatus.

The apparatus may comprise means for: sending the time sensitive communication assistance information for the quality of service flow to another apparatus.

The other apparatus may be a session management function apparatus or a radio access network function apparatus.

According to an aspect there is provided a method comprising: identifying a stream gate instance associated with a quality of service flow; and determining time sensitive communication assistance information for the quality of service flow based on one or more parameters defining operation of the stream gate instance.

The one or more parameters defining operation of the stream gate instance associated with the quality of service flow may be stored in a stream filter instance information table.

The one or more parameters defining operation of the stream gate instance may comprise at least one of (i) a parameter defining a sequence with which the stream gate instance is opened and closed and (ii) a parameter defining a periodicity of a cycle of the stream gate instance.

The parameter defining a sequence with which the stream gate instance is opened and closed comprises OperControlList or AdminControlList.

The parameter defining a periodicity of a cycle of the stream gate instance cycle may comprise OperCycleTime or AdminCycleTime.

The time sensitive communication assistance information for the quality of service flow may comprise at least one of a flow direction, a periodicity and a burst arrival time.

Identifying a stream gate instance associated with a quality of service flow may comprise: determining ingress and egress ports of a destination address included in in one or more entries of a filtering database table.

The filtering database table may be provided by a centralized network configuration.

Identifying a stream gate instance associated with a quality of service flow may comprise: determining a stream identifier uniquely identifying a stream associated with the destination address.

Identifying a stream gate instance associated with a quality of service flow may comprise: mapping the stream identifier to the ingress and egress ports.

Identifying a stream gate instance associated with a quality of service flow may comprise: mapping the stream identifier to a stream gate instance identifier; and identifying a stream gate instance uniquely identified by the stream gate instance identifier and associated with a quality of service flow.

The stream may be a time-sensitive networking stream.

The method may be performed by an application function apparatus, a session management function apparatus or a policy control function apparatus.

The method may comprise: sending the time sensitive communication assistance information for the quality of service flow to another apparatus.

The other apparatus may be a session management function apparatus or a radio access network function apparatus.

According to an aspect there is provided a computer program comprising computer executable code which when run on at least one processor is configured to: identify a stream gate instance associated with a quality of service flow; and determine time sensitive communication assistance information for the quality of service flow based on one or more parameters defining operation of the stream gate instance.

The one or more parameters defining operation of the stream gate instance associated with the quality of service flow may be stored in a stream filter instance information table.

The one or more parameters defining operation of the stream gate instance may comprise at least one of (i) a parameter defining a sequence with which the stream gate instance is opened and closed and (ii) a parameter defining a periodicity of a cycle of the stream gate instance.

The parameter defining a sequence with which the stream gate instance is opened and closed comprises OperControlList or AdminControlList.

The parameter defining a periodicity of a cycle of the stream gate instance cycle may comprise OperCycleTime or AdminCycleTime.

The time sensitive communication assistance information for the quality of service flow may comprise at least one of a flow direction, a periodicity and a burst arrival time.

Identifying a stream gate instance associated with a quality of service flow may comprise: determining ingress and egress ports of a destination address included in in one or more entries of a filtering database table.

The filtering database table may be provided by a centralized network configuration.

Identifying a stream gate instance associated with a quality of service flow may comprise: determining a stream identifier uniquely identifying a stream associated with the destination address.

Identifying a stream gate instance associated with a quality of service flow may comprise: mapping the stream identifier to the ingress and egress ports.

Identifying a stream gate instance associated with a quality of service flow may comprise: mapping the stream identifier to a stream gate instance identifier; and identifying a stream gate instance uniquely identified by the stream gate instance identifier and associated with a quality of service flow.

The stream may be a time-sensitive networking stream.

The at least one processor may be part of an application function apparatus, a session management function apparatus or a policy control function apparatus.

The computer program may comprise computer executable code which when run on at least one processor is configured to: send the time sensitive communication assistance information for the quality of service flow to another apparatus.

The other apparatus may be a session management function apparatus or a radio access network function apparatus.

According to an aspect there is provided an apparatus comprising at least one processor and at least one memory including computer code for one or more programs, the at least one memory and the computer code configured, with the at least one processor, to cause the apparatus at least to: receive time sensitive communication assistance information for a quality of service flow from a first other apparatus, wherein the time sensitive communication assistance information for the quality of service flow is determined based on one or more parameters defining operation of a stream gate instance associated with the quality of service flow; and forward the time sensitive communication assistance information for the quality of service flow to a second other apparatus.

The apparatus may be a session management function apparatus.

The first other apparatus may be an application function apparatus or a policy control function apparatus.

The second other apparatus may be a radio access network apparatus.

According to an aspect there is provided an apparatus comprising circuitry configured to: receive time sensitive communication assistance information for a quality of service flow from a first other apparatus, wherein the time sensitive communication assistance information for the quality of service flow is determined based on one or more parameters defining operation of a stream gate instance associated with the quality of service flow; and forward the time sensitive communication assistance information for the quality of service flow to a second other apparatus.

The apparatus may be a session management function apparatus.

The first other apparatus may be an application function apparatus or a policy control function apparatus.

The second other apparatus may be a radio access network apparatus.

According to an aspect there is provided an apparatus comprising means for: receiving time sensitive communication assistance information for a quality of service flow from a first other apparatus, wherein the time sensitive communication assistance information for the quality of service flow is determined based on one or more parameters defining operation of a stream gate instance associated with the quality of service flow; and forwarding the time sensitive communication assistance information for the quality of service flow to a second other apparatus.

The apparatus may be a session management function apparatus.

The first other apparatus may be an application function apparatus or a policy control function apparatus.

The second other apparatus may be a radio access network apparatus.

According to an aspect there is provided a method comprising: receiving time sensitive communication assistance information for a quality of service flow from a first other apparatus, wherein the time sensitive communication assistance information for the quality of service flow is determined based on one or more parameters defining operation of a stream gate instance associated with the quality of service flow; and forwarding the time sensitive communication assistance information for the quality of service flow to a second other apparatus.

The method may be performed by a session management function apparatus.

The first other apparatus may be an application function apparatus or a policy control function apparatus.

The second other apparatus may be a radio access network apparatus.

According to an aspect there is provided a computer program comprising computer executable code which when run on at least one processor is configured to: receive time sensitive communication assistance information for a quality of service flow from a first other apparatus, wherein the time sensitive communication assistance information for the quality of service flow is determined based on one or more parameters defining operation of a stream gate instance associated with the quality of service flow; and forward the time sensitive communication assistance information for the quality of service flow to a second other apparatus.

The at least one processor may be part of a session management function apparatus.

The first other apparatus may be an application function apparatus or a policy control function apparatus.

The second other apparatus may be a radio access network apparatus.

According to an aspect there is provided an apparatus comprising at least one processor and at least one memory including computer code for one or more programs, the at least one memory and the computer code configured, with the at least one processor, to cause the apparatus at least to: receive time sensitive communication assistance information for a quality of service flow from another apparatus, wherein the time sensitive communication assistance information for the quality of service flow is determined based on one or more parameters defining operation of a stream gate instance associated with the quality of service flow; and use the time sensitive communication assistance information for the quality of service flow to schedule the quality of service flow.

The apparatus may be a radio access network apparatus.

The other apparatus may be a session management function apparatus.

According to an aspect there is provided an apparatus comprising circuitry configured to: receive time sensitive communication assistance information for a quality of service flow from another apparatus, wherein the time sensitive communication assistance information for the quality of service flow is determined based on one or more parameters defining operation of a stream gate instance associated with the quality of service flow; and use the time sensitive communication assistance information for the quality of service flow to schedule the quality of service flow.

The apparatus may be a radio access network apparatus.

The other apparatus may be a session management function apparatus.

According to an aspect there is provided an apparatus comprising means for: receiving time sensitive communication assistance information for a quality of service flow from another apparatus, wherein the time sensitive communication assistance information for the quality of service flow is determined based on one or more parameters defining operation of a stream gate instance associated with the quality of service flow; and using the time sensitive communication assistance information for the quality of service flow to schedule the quality of service flow.

The apparatus may be a radio access network apparatus.

The other apparatus may be a session management function apparatus.

According to an aspect there is provided a method comprising: receiving time sensitive communication assistance information for a quality of service flow from another apparatus, wherein the time sensitive communication assistance information for the quality of service flow is determined based on one or more parameters defining operation of a stream gate instance associated with the quality of service flow; and using the time sensitive communication assistance information for the quality of service flow to schedule the quality of service flow.

The method may performed by be a radio access network apparatus.

The other apparatus may be a session management function apparatus.

According to an aspect there is provided a computer program comprising computer executable code which when run on at least one processor is configured to: receive time sensitive communication assistance information for a quality of service flow from another apparatus, wherein the time sensitive communication assistance information for the quality of service flow is determined based on one or more parameters defining operation of a stream gate instance associated with the quality of service flow; and use the time sensitive communication assistance information for the quality of service flow to schedule the quality of service flow.

The at least one processor may be part of a radio access network apparatus.

The other apparatus may be a session management function apparatus.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
CN: Core Network
CNC: Centralized Network Configuration
CU: Centralized Unit
DL: Downlink
DN: Data Network
DU: Distributed Unit
DS: Device Side
DS-TT: Device Side Time sensitive networking Translator
gNB: gNodeB
GSM: Global System for Mobile communication
IoT: Internet of Things
IIoT: Industrial IoT
IO: Input Output
IP: Internet Protocol
LTE: Long Term Evolution
MAC: Medium Access Control MDBV: Maximum Data Burst Volume
MS: Mobile Station
NEF: Network Exposure Function
NR: New Radio
PCF: Policy Control Function
PCP: Priority Code Point
PDA: Personal Digital Assistant
PDB: Packet Delay Budget
PSFP: Per Stream Filtering and Policing
PTP: Precision Time Protocol
QoS: Quality of Service
RAM: Random Access Memory
RAN: Radio Access Network
ROM: Read Only Memory
SDU: Service Data Unit
SMF: Session Management Function
TSC: Time Sensitive Communication
TSCAI: Time Sensitive Communication Assistance Information
TSN: Time Sensitive Networking
TT: TSN Translator
UE: User Equipment
UL: Uplink
UMTS: Universal Mobile Telecommunication System
USB: Universal Serial Bus
VLAN: Virtual Local Access Network
3GPP: $3^{rd}$ Generation Partnership Project
5G: $5^{th}$ Generation
5G AN: 5G Access Network
5GC: 5G Core network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
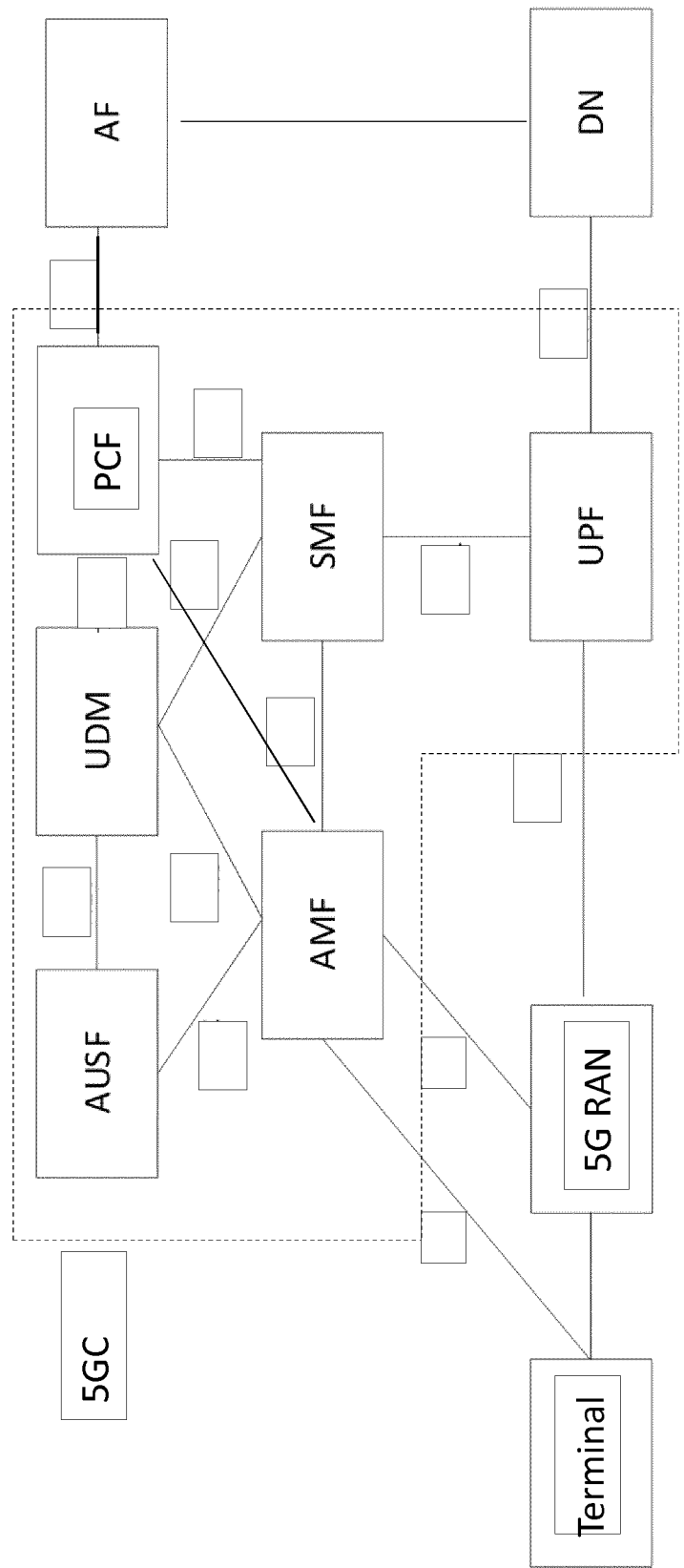
FIG. 1 shows a schematic representation of a 5G system (5GS)

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a policy control function (NEF).

Figure 2:
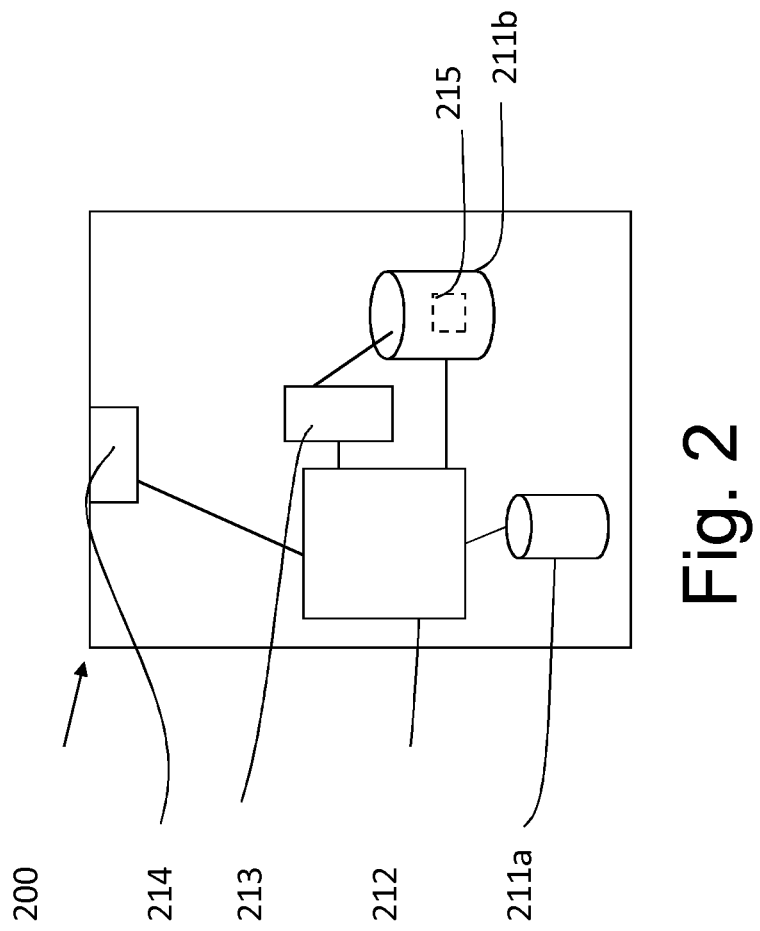
FIG. 2 shows a schematic representation of a control apparatus.

FIG. 2 illustrates an example of a control apparatus 200 for controlling a function of the 5G RAN or 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function the 5G RAN or 5GC. In some embodiments, each function of the 5G RAN or 5GC comprises a control apparatus 200. In alternative embodiments, two or more functions of the 5G RAN or 5GC may share a control apparatus.

Figure 3:
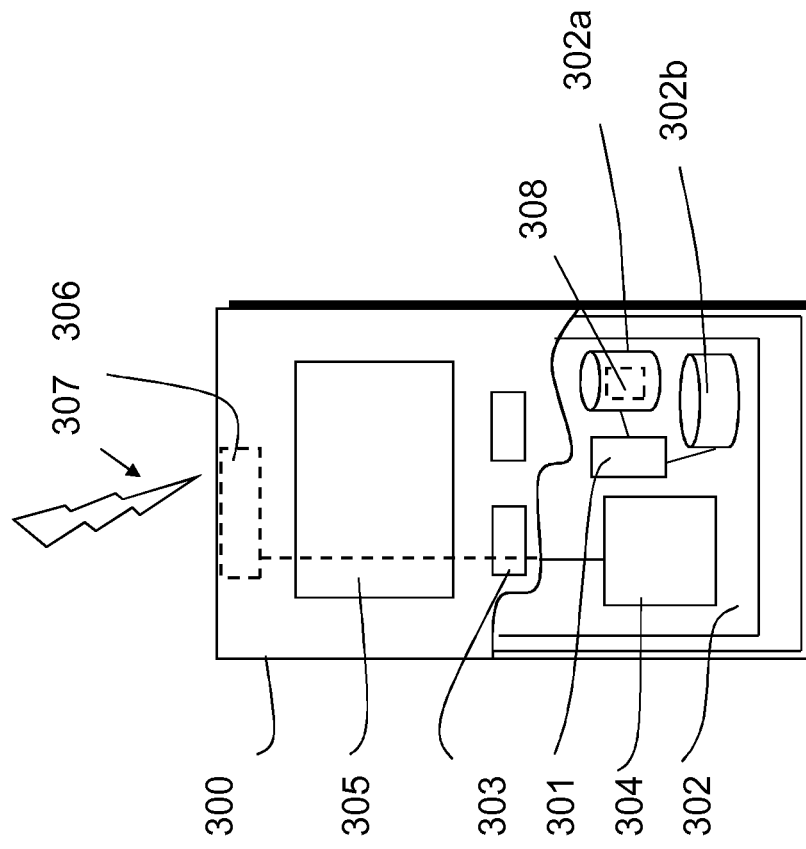
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding and following aspects relate to 5GS, it will be understood that similar aspects may relate to other systems.

One or more of the following aspects relate to tactile industrial networks, also known as Industrial IoT (IIoT) or Industry 4.0 networks. In such networks, 3GPP technologies (i.e. cellular technologies) may be applied in addition to wired time sensitive networking (TSN) in industrial environments to provide flexibility (in terms of mobility) and scalability (in terms of number of sensors or actuators).

Time sensitive communication assistance information (TSCAI) has been standardized by the 3GPP and reflects the traffic pattern of time sensitive communication (TSC) flows. TSCAI may be used by a gNB to derive an efficient scheduling policy.

The determination of TSCAI per TSC flow cannot be done by using gate scheduling information provided by the time sensitive network (TSN) centralized network configuration (CNC) according to IEEE 802.1Qbv. The gate scheduling information according to IEEE 802.1Qbv does not provide any information on the individual TSN streams or information on the ingress port where a particular TSN stream is received. The IEEE802.1Qbv mainly provides information on the egress port and the gates at the egress port in terms of gates opening and closing schedules.

For example, the parameters configured by TSN CNC may be the gate state ("open" or "closed"), time interval for which the gate remains in the assigned state, CycleStartTime, AdminCycleTime, queueMaxSDU, etc. Such parameters may be used to determine the time at which the egress port needs to be open, for which duration of time it needs to remain open, and with what periodicity it will repeat such operation.

However, using solely these parameters, there may be no means for the 5GS to determine for which particular quality of service (QoS) flow such pattern is applicable, such that the gNB and the UE can be accordingly configured (in order for a 5GS to deliver the expected frames at expected egress at expected time). In other words, there is no means to unambiguously map the IEEE802.Qbv schedule and the QoS flow which needs to be compliant with it.

The 3GPP standard [TS 23.501] defines a quality of service (QoS) feature called "periodic deterministic QoS" in order to support periodic deterministic communications for which the traffic patterns are known beforehand. Such feature comprises the following extensions to the 5GS QoS framework:

Time sensitive communication assistance information (TSCAI)—a set of parameters describing time sensitive communication (TSC) flow traffic patterns for a 5GS QoS flow.

Support for hold and forward buffering in the time sensitive networking (TSN) Translator (UE side and UPF side) for de-jittering TSN flows.

The TSCAI may be useful for a gNB to allow for efficiently scheduling periodic, deterministic traffic flows either via Configured Grants, Semi-Persistent Scheduling or with dynamic grants. The TSCAI is provided from SMF to 5G RAN (e.g. after QoS flow establishment).

Table 1 taken from [TS 23.501] shows the parameters that are included in TSCAI.

| Assistance Information | Description |
| --- | --- |
| Flow Direction | The direction of the TSC flow (uplink or downlink) |
| Periodicity | It refers to the time period between the start of two data bursts |
| Burst Arrival Time | The arrival time of a data burst at either an ingress interface of the RAN (downlink flow direction) or an egress interface of the UE (uplink flow direction) |

In the 3GPP SA2 meeting #133, May 2019, the following has been agreed on the basis of the contribution [S2-1906663].

The TSCAI Burst Size may be used to set a maximum data burst volume (MDBV).

The packet delay budget (PDB) may be explicitly divided into 5G RAN PDB and CN PDB. The 5G RAN PDB may be the packet delay budget applicable to the radio interface, including RAN processing. The CN PDB may be the delay between a UPF terminating N6 interface and a 5G RAN. Separate delay budgets may be used for calculation of expected packet transmit times on 5GS interfaces.

The TSCAI Burst Arrival Time calculation may use user equipment device side time sensitive networking translator (DS-TT) residence time and CN PDB as per clause 5.27. For downlink (DL) TSCAI Burst Arrival Time determination, CN PDB may be used. For uplink (UL) TSCAI Burst Arrival Time determination, DS-TT residence time may be used.

Figure 4:
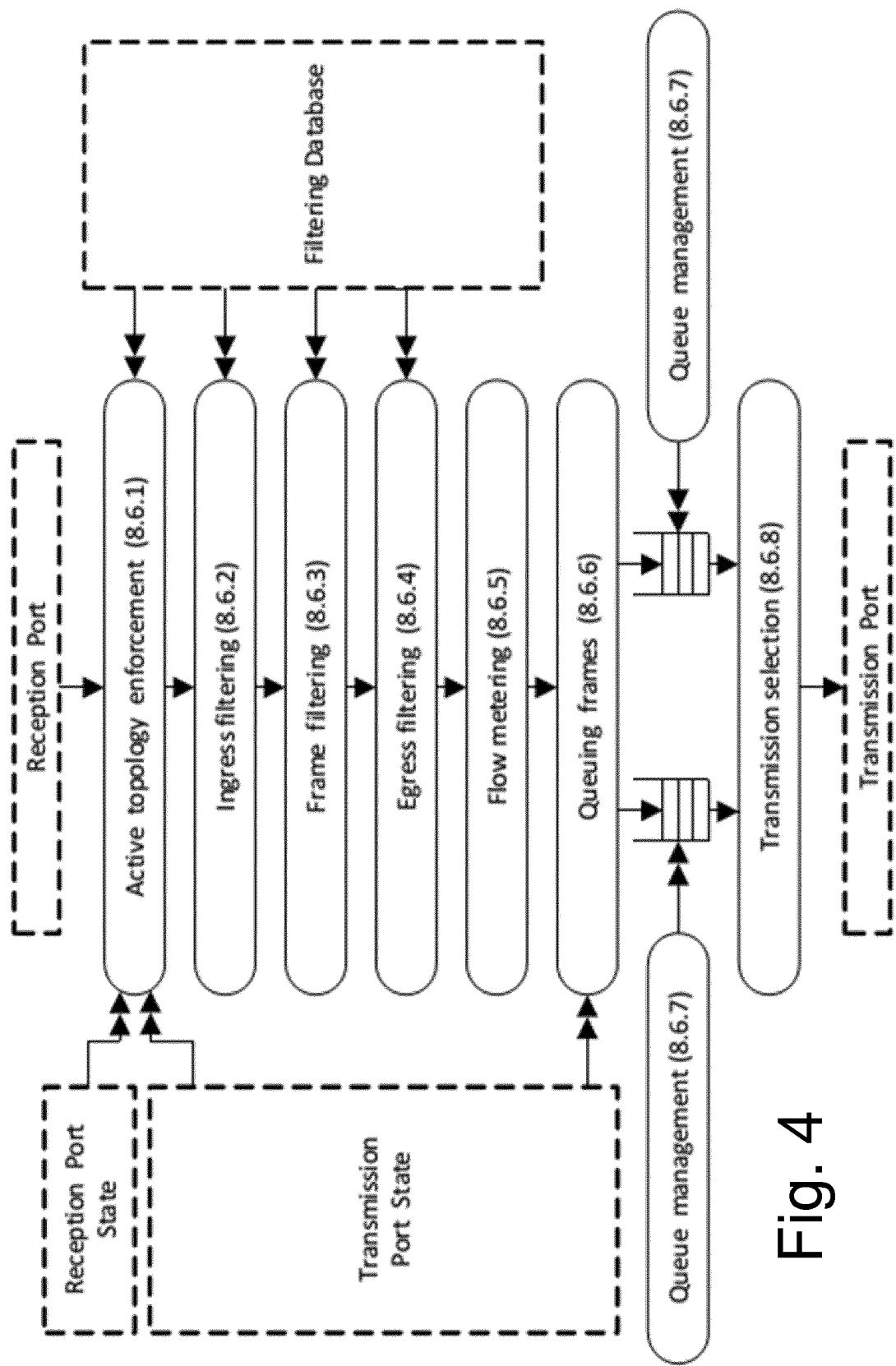
FIG. 4 shows a schematic representation of an IEEE 802.1Q Forwarding Process.

FIG. 4 shows the IEEE 802.1Q forwarding process (taken from [IEEE 802.1Q-2018, FIG. 8-12, page 188]).

A relevant part is the Frame Filtering where based on e.g. Destination MAC address and virtual local area network identifier (VLAN ID), a particular Ethernet frame may be forwarded to a set of egress (transmission) ports. The rules for this forwarding may be defined by a Filtering Database (Fdb, [IEEE802.1.Q-2018, Section 8.8]).

It may be noted that all TSN streams may be assigned uniquely to a unicast or multicast MAC address. The unicast or multicast MAC address may not be used as an actual MAC address by any device within the Ethernet network but may have been assigned by a network management tool.

Another relevant part is the Flow Metering (or more specifically the Per-Stream Filtering and Policing) where based on filtering and policing rules, frames may be forwarded to individual port gates based on per-TSN-stream decisions. Hence, these rules may provide information on the characteristics of individual TSN streams and how they may be forwarded to individual port gates. For example, IEEE 802.1Qci defines a Stream Filter Instance Table (Section 12.31.2 of IEEE 802.1Qci) which defines such rules via a set of parameters such as StreamHandle (identifier of the stream), StreamGateInstanceID (identifier of the gate), priority of the rule, etc. These rules and a bridge behaviour are described in more detail in IEEE 802.1Qci and IEE 802.1Q-2018, Section 8.6.5.

The Transmission Selection of the bridge may be responsible for deciding which frame of which traffic class queue is transmitted at which point in time on a particular port (IEEE 802.1Qbv and IEEE 802.1Q-2018, Section 8.6.8 and in particular Section 8.6.8.4). This may allow to derive the exact time window when a frame of a certain traffic class is supposed to be transmitted to an adjacent input output (IO) device or TSN bridge.

One or more of the following aspects describe how the above information can be exploited to derive information for setting up a TSC flow using TSCAI.

One or more of the following aspects describe techniques for derivation of TSCAI parameters and to unambiguously map these parameters to a corresponding QoS flow:

Based on gate schedule information from IEEE standards and protocols (e.g. 802.1Q, 802.1Qbv, 802.1Qci), the TSCAI parameters burst arrival time and periodicity may be derived. For example, the following parameters may be used:

AdminBaseTime: The administrative value of base time, expressed as an IEEE 1588 precision time protocol (PTP) timescale (only used implicitly).

CycleStartTime: The time at which a next gate control list execution cycle is to start, expressed as an IEEE 1588 precision time protocol (PTP) timescale (only used implicitly).

Oper(Admin)ControlList: defines the sequence with which the individual gates are opened/closed.

Oper(Admin)CycleTime: defines the periodicity of the gate cycle.

queueMaxSDU: An unsigned integer value, denoting the maximum SDU size supported by the queue.

It may be noted that IEEE 802.1Qci comprises similar parameters as listed above, such as PSFPAdminControlList, PSFPOperControlList, PSFPAdminCycleTime, PSFPOperCycleTime, PSFPAdminBaseTime, Maximum SDU size, etc. Table 8-8 from IEEE 801.Q and IEEE Qci shows the correspondence between the procedures/variables used in 802.1Q and 802.1Qbv and PSFP versions of these procedures/variables.

These parameters may be used to derive the TSCAI parameters burst arrival time and periodicity for each TSN stream.

It may be noted that the filter and policy rules may be defined for each egress port, hence, this information may already be sufficient to derive where a particular TSN stream has to be delivered.

The next step is to derive where a TSN stream is received.

Based on static filtering tables information in the filtering database [IEEE 802.1Q-2018, RFC 4363] and the IEEE 802.1Qci stream filter instance table, the mapping between the TSCAI parameters derived above and a specific QoS flow may be done (for which the reception port is required).

A prerequisite for supporting the per-stream filtering and policing by means of 802.1Qci may require implementation of a stream identification function [IEEE 802.1CB, see Clause 6] where the "stream_handle" (identifier of the stream) provided by this function is used for policing and queuing decisions. Furthermore, in order to perform mapping between the TSCAI parameters derived above and a specific QoS flow, the identification of the TSN stream may need to comprise the destination MAC address, which is unique to each TSN stream:

The filtering database tables entries may contain the information on the (ingress/egress) port pairs for specific destination MAC address and VLAN identifier. Furthermore, as a stream identifier may comprise the destination MAC address, the stream may be unambiguously mapped to the (ingress/egress) port pair.

Based on a stream filter instance [802.1Qci] which may contain the stream_handle (stream identifier as specified by IEEE 802.1CB) and the identifier of the gate to which the stream with a specific stream_handle should be mapped, the unambiguous mapping between the stream identifier and the stream gate instance identifier may be done.

As a result, the unambiguous mapping between (ingress/egress) port pair (PDU session), stream identifier, stream gate instance identifier and corresponding gate schedules may be done.

It may be noted that in TSN, gates (queues) may be associated to different traffic classes, and bridges may be configured to map incoming traffic to specific traffic classes/queues/gates based on the priority code point (PCP) field in frame header and pre-configured "PCP-to-traffic class" mapping table. A 5GS bridge may implement different traffic classes by means of different QoS flows. Therefore, a stream gate instance identifier may be mapped to a QoS flow identifier. This may allow accurate derivation of RAN schedules which may need to be applied to particular QoS flows, irrespective of the mapping between TSN streams and QoS flows (one to one or many to one mapping).

One or more of the aspects of this disclosure relate to the mapping of TSCAI to QoS flows. It may be assumed that one QoS flow serves one gate of a port of a 5GS bridge. For this purpose, a relevant part is to identify the ports where TSN streams are received and where frames of a TSN stream have to be delivered. For this purpose, the information of the filtering database and the per-stream filtering and policing may be combined. The filtering database may define a dot1qStaticMulticastTable:

"A table containing filtering information for Multicast and Broadcast MAC addresses for each VLAN, configured into the device by (local or network) management specifying the set of ports to which frames received from specific ports and containing specific Multicast and Broadcast destination addresses are allowed to be forwarded. A value of zero in this table (as the port number from which frames with a specific destination address are received) is used to specify all ports for which there is no specific entry in this table for that particular destination address. Entries are valid for Multicast and Broadcast addresses only" [RFC 4363].

Similarly, the dot1qStaticUnicastTable may be defined for unicast MAC addresses.

Hence, the entries in the filtering database may allow for deriving the ingress and egress ports of frames with a particular destination MAC address. This address, however, may be unique to each TSN Stream as defined by the StreamHandle applied in IEEE 802.1Qci and defined in IEEE 802.1CB:

StreamHandle: the stream handle may be associated with the information provided for a specific TSN Stream. A TSN Stream may be associated with a unique unicast/multicast MAC address (see IEEE 802.1Q-2018, Section 35.2.2.8.3). The corresponding MAC address may be derived by using IEEE802.1CB, Section 9.1: A tsnStreamIdEntry, Option 1: tsnStreamIdIdentificationType=1, i.e., Null Stream identification, and tsnCpeNullDownDestMac, which identifies the destination MAC address.

Option 2: tsnStreamIdIdentificationType=3, i.e., destination MAC address and VLAN, and tsnCpeDmacVlanDownDestMac, which identifies the destination MAC address.

Option 3: tsnStreamIdIdentificationType=4, i.e., IP stream identification, and tsnCpeIpIdDestMac, which identifies the destination MAC address.

Using the above information, a 5GS bridge may be able to identify the ingress (reception) ports and egress (transmission) ports of each TSN stream.

In the next step, the TSCAI parameters burst arrival time, periodicity and flow direction may be derived using a stream filter instance table defined in IEEE 802.1Qci (cf. point (1) in Sec.5).

The stream filter instance table may define:

Stream handle, which uniquely associates a filter instance of specific gate ID (i.e. StreamGateInstance ID) with a TSN stream.
Priority Specification.
Stream gate instance, which defines among others (see IEEE 802.1Q-2018, Table 12-33):
  PSFPAdminControlList and PSFPOperControlList:
    Defines the control list for the gate, i.e., a sequence of entries each defining the gate state, the time interval, and the maximum number of bits.
  PSFPAdminCycleTime/PSFPOperCycleTime: Periodicity of each cycle (see IEEE 802.1Q, Section 8.6.9).
  Maximum SDU size, which allows for deriving a Maximum Databurst Size for the QoS flow.

Using this information, the following may be derived.

TSCAI Burst Arrival Time (BAT) from the PSFPOperControlList and each individual timestamp tGate_Open state within this list.

In one example, for uplink BAT=tGate_Open−PDB, where PDB=delay between UE egress to UPF egress including NW-TT).

In another example, for downlink BAT=tGate_Open−(PDB-AN part+UE residence time including DS-TT).
TSCAI Periodicity from the PSFPOperCyleTime.

Such TSCAI may apply to specific stream gate instance identifier (i.e. StreamGateInstance identifier). Overall, the mapping between the derived TSCAI, the stream identifier, (ingress/egress) port pairs (i.e. PDU session) and the stream gate instance identifier (i.e. QoS flow) may be done.

Figure 5:
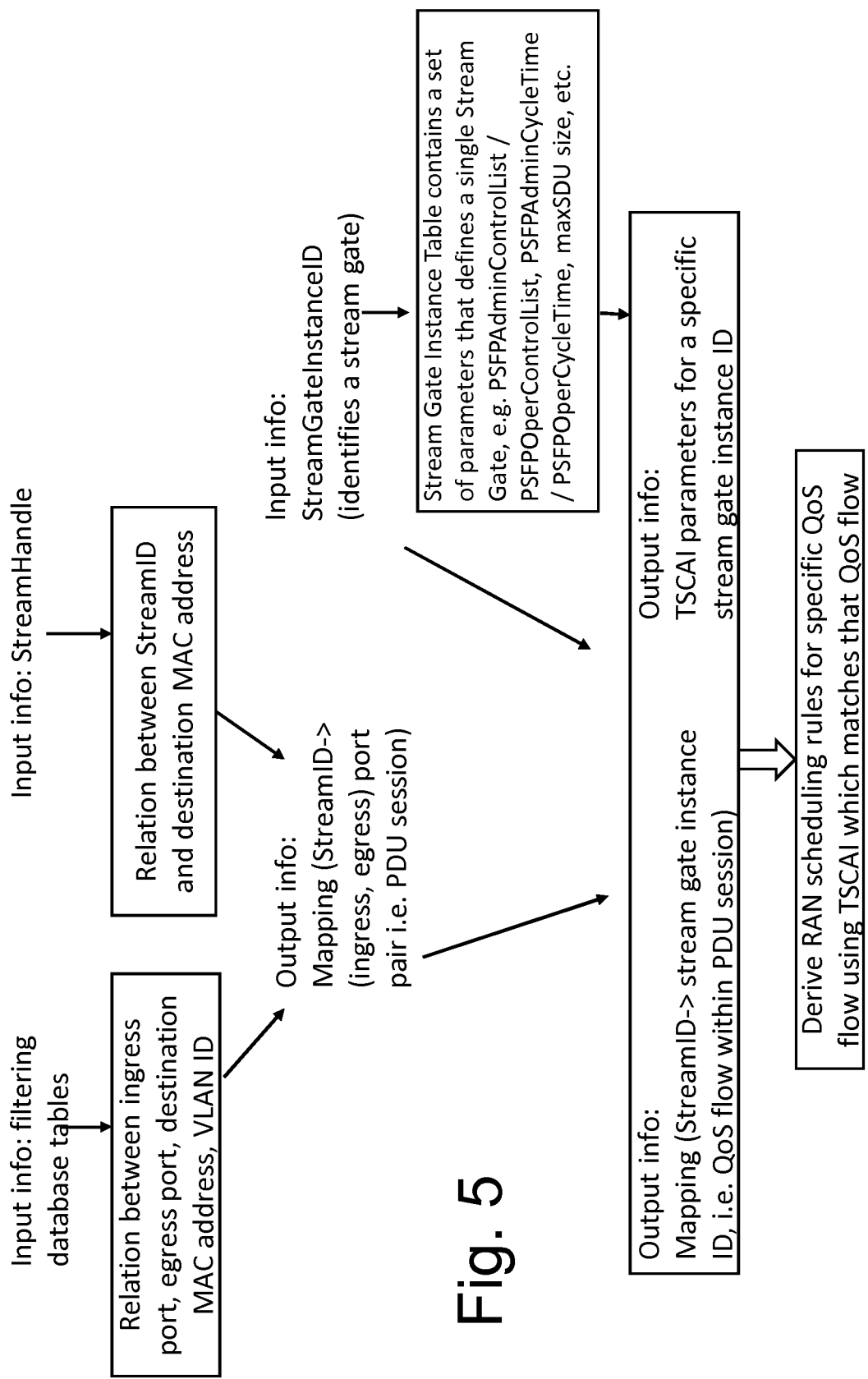
FIG. 5 shows a schematic representation of a method for determining time sensitive communication assistance information for a quality of service flow.

FIG. 5 summarizes how the above mappings may be derived. The relation between ingress port, egress port, destination MAC address and VLAN identifier may be derived based on one or more filtering database tables. The relation between stream identifier and destination MAC address may be derived based on one or more stream filter instance tables. The relation between stream identifier and stream gate instance identifier may be based on one or more stream filter instance tables. The relation between parameters PSFPAdm inControlList, PSFPOperControlList, PSFPAdminCycleTime, PSFPAdminCycleTime and maxSDU size, etc. defining operation of a gate and a gate may be based on one or more stream filter instance tables.

A destination MAC address may be mapped to an ingress port and an egress port using one or more filtering database table entries. The destination MAC address may further be mapped to a stream identifier using one or more stream filter instance tables.

In this way, the stream identifier may be mapped to the ingress port and the egress port via the destination MAC address.

The stream identifier may be mapped to a stream gate instance identifier using one or more stream filter instance tables. The stream gate instance identifier uniquely identifies a gate associated with a QoS flow.

The stream gate instance identifier may be mapped to one or more parameters PSFPAdminControlList, PSFPOperControlList, PSFPAdminCycleTime, PSFPAdminCycleTime and maxSDU size, etc. defining operation of a gate using one or more stream filter instance tables.

TSCAI may then be derived for the stream gate instance identifier and therefore for the QoS flow associated with the stream gate instance identifier. The TSCAI may be provided to the RAN. The RAN may derive scheduling rules for the QoS flow using the TSCAI.

It will be understood that a filtering database table may also provide information about the TSCAI Flow Direction. If the ingress port is located at a UE and the egress port is located at the UPF, then TSCAI flow direction may be uplink. If the ingress port is located at the UPF and egress port is located at a UE, then TSCAI Flow Direction may be downlink; the burst arrival time may be derived from PSFPOperControlList and the PDB within the core network.

If the ingress and egress ports are located at a UE, two TSC flows and their respective TSCAI may have to be derived. An uplink flow from the UE where the ingress port is located and the corresponding TSCAI may be derived using the Burst Arrival Time as described above. For the downlink flow from the UPF to the UE where the egress port is located, the Burst Arrival Time may be derived from the expected arrival of the frame in the uplink flow.

The burst arrival time of the downlink flow may take into account the processing required to switch from the uplink TSC flow to the downlink TSC flow.

The above derivation of TSCAI parameters may take place in the AF network TSN translator (NW-TT) based on the information provided by the TSN CNC. The derived parameters may be provided to the SMF directly or via the PCF for setting up the corresponding QoS flows.

Figure 6:
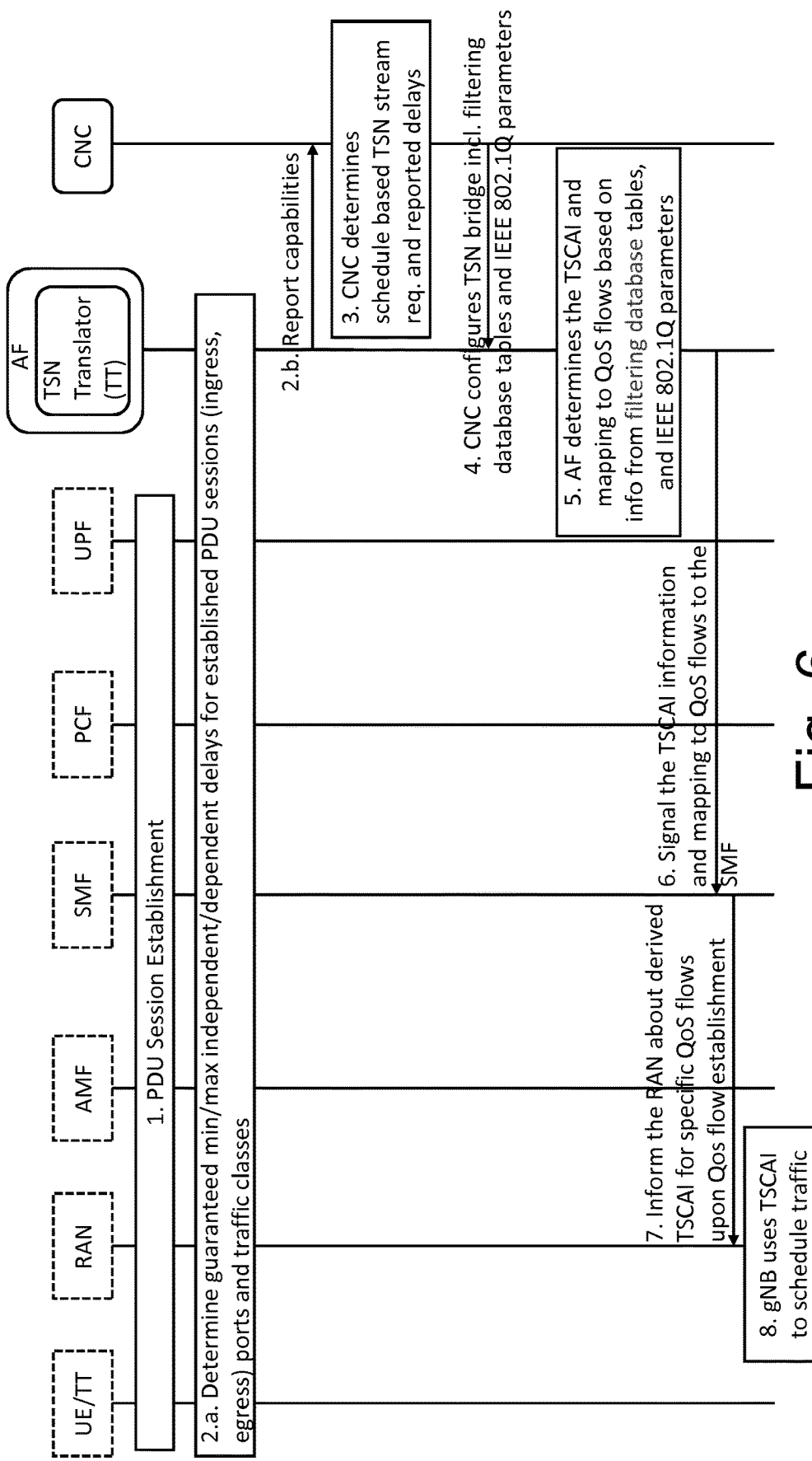
FIG. 6 shows a schematic representation of a method for determining, forwarding and using time sensitive communication assistance information for a quality of service flow.

FIG. 6 illustrates the described procedures and involved entities. Alternatively, the PCF or SMF can perform the TSCAI determination based on the information received from AF.

In step 1, a PDU session is established between the UE (DS-TT) and the UPF.

In step 2a, guaranteed min/max independent/dependent delays for established PDU sessions (ingress/egress) ports and traffic classes may be determined. The determination may be performed by the PCF or the AF.

In step 2b, capabilities (i.e. guaranteed min/max independent/dependent delays for established PDU sessions (ingress/egress) ports and traffic classes determined in step 2a) may be reported to the CNC by the AF.

In step 3, the CNC may compute the transmission schedule for the bridge by using TSN stream requirements and reported bridge delay values. Details of computing the transmission schedule may be found in IEEE.802.1Q specifications.

In step 4, the CNC may configure a TSN bridge by sending filtering database tables and IEEE 802.1Q parameters to the AF.

In step 5, the AF may determine and map TSCAI to QoS flows based on the filtering database tables and IEEE 802.1Q parameters.

In step 6, the AF may signal the TSCAI information and mapping to QoS flows to the SMF.

In step 7, the SMF may inform the RAN about derived TSCAI for specific QoS flows upon QoS flow establishment.

In step 8, the RAN may use the TSCAI to schedule traffic for the specific QoS flows.

In the case that both ingress and egress ports of a TSN stream are located at a UE, the AF may further configure the UPF such that frames received in the uplink flow may be directly switched/scheduled for the downlink flow. This is not depicted in the flow chart of FIG. 6.

Each UE may be configured such that one or more destination MAC addresses (each of which unanimously corresponds to a TSN stream) are assigned to the QoS flow. Using the destination MAC address, the UE may then be able to assign the frame received to the correct QoS flow.

Figure 7:
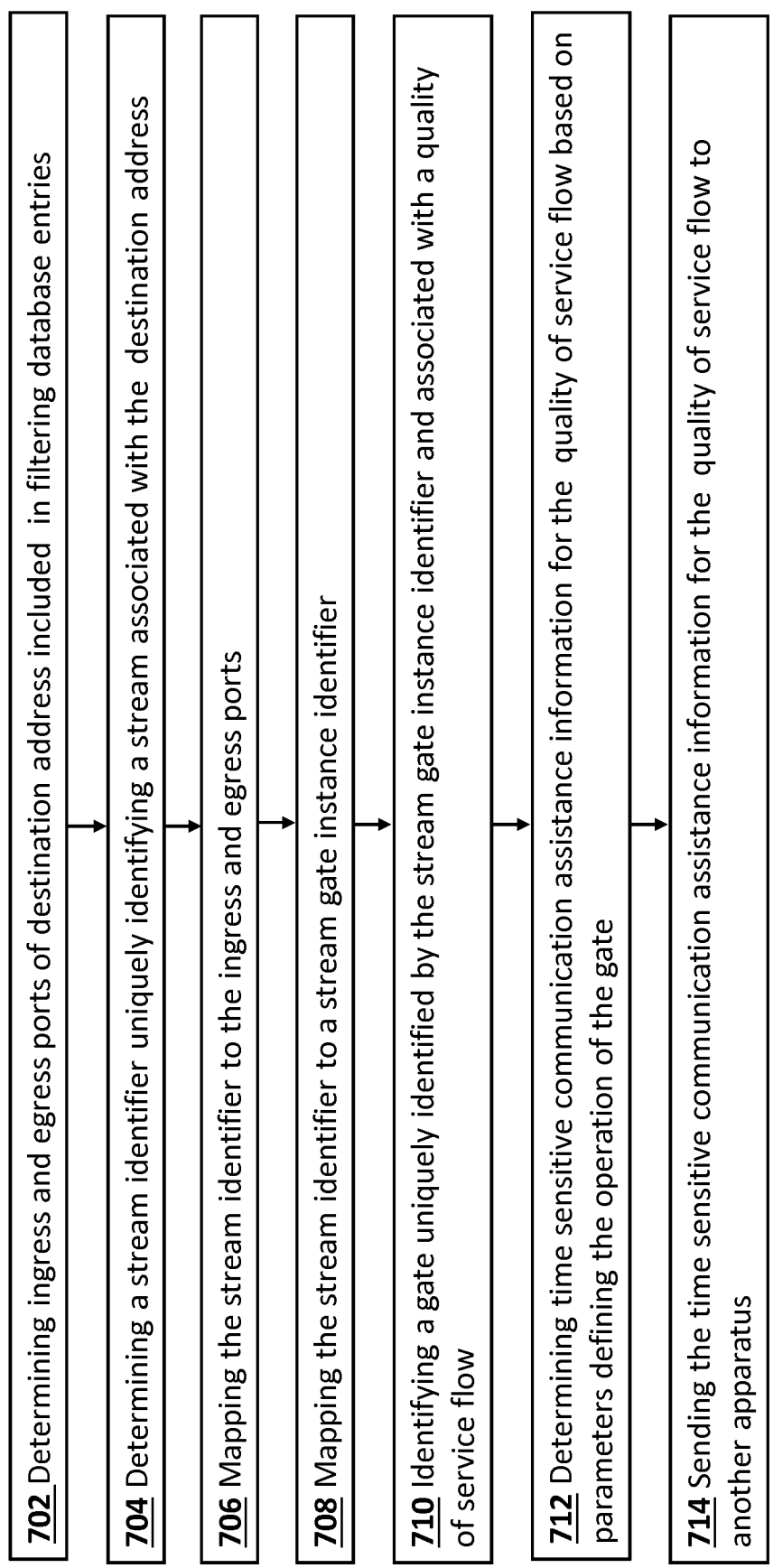
FIG. 7 shows a schematic representation of a method for determining time sensitive communication assistance information for a quality of service flow, for example performed by an application function apparatus.

FIG. 7 shows a schematic representation of a method for determining time sensitive communication assistance information for a QoS flow. The method may be performed by an apparatus such as an AF apparatus, PCF apparatus, or an SMF apparatus.

In step 702, the apparatus may determine ingress and egress ports of a destination address included in the entries of the filtering database tables. The apparatus may for example use one or more filtering database tables as described above (i.e. the destination address may be included in an entry of a filtering database). A frame corresponding to this destination address may be sent by a neighbouring TSN end station or TSN bridge. Generally, the frame structure may be specified in IEEE 802.1 Q documents. On the highest level, it contains a header and a payload (Protocol Data Unit, PDU and Service Data Unit, SDU respectively). Destination (MAC) address may be part of the header, as are VLAN ID, source address, priority code point (PCP) value, etc. The filtering database tables may be provided by the CNC.

It will be understood that during operation, the bridge may look up the destination address included in a received frame. During TSCAI derivation, a tuple <ingress port, egress port, destination address, TSCAI, QoS flow> may be available and may be stored. The bridge may use this tuple to select TSCAI for the looked up destination address, and forward the frame using the QoS flow that corresponds to this TSCAI.

In step 704, the apparatus may determine a stream identifier uniquely identifying a stream associated with the destination address. The apparatus may for example use one or more stream filter instance tables as described above. The stream filter instance tables may be provided by the CNC.

In step 706, the apparatus may map the stream identifier determined in step 704 to the ingress and egress ports determined in step 702. The apparatus may for example use the one or more stream filter instance tables as described above.

In step 708, the apparatus may map the stream identifier determined in step 704 to a stream gate instance identifier. The apparatus may for example use the one or more stream filter instance tables as described above.

In step 710, the apparatus may identify a gate uniquely identified by the stream gate instance identifier determined in step 708 and associated with a QoS flow. The association may be stored at the AF, the PCF or at a generic storage function.

In step 712, the apparatus may determine TSCAI for the QoS flow based on parameters defining the operation of the gate determined in step 710. The apparatus may for example use the one or more stream filter instance tables as described above.

In step 714, the apparatus may send the TSCAI for the quality of service flow determined in step 712 to another apparatus. When the apparatus is an AF or a PCF apparatus, the other apparatus may be an SMF apparatus. When the apparatus is an SMF apparatus, the other apparatus may be a RAN apparatus.

Figure 8:
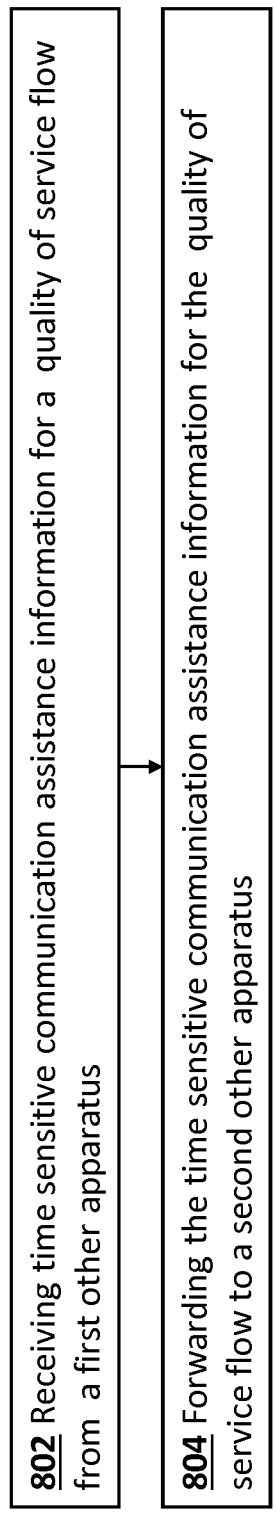
FIG. 8 shows a schematic representation of a method for forwarding time sensitive communication assistance information for a quality of service flow, for example performed by a session management function apparatus.

FIG. 8 shows a schematic representation of a method for forwarding TSCAI for a QoS flow. The method may be performed by an apparatus such as a SMF apparatus.

In step 802, the apparatus may receive TSCAI for a QoS from a first other apparatus. The first other apparatus may be an AF apparatus or PCF apparatus.

In step 804, the apparatus may forward the TSCAI for the QoS received in step 802 to a second other apparatus. The second other apparatus may be a RAN apparatus.

Figure 9:
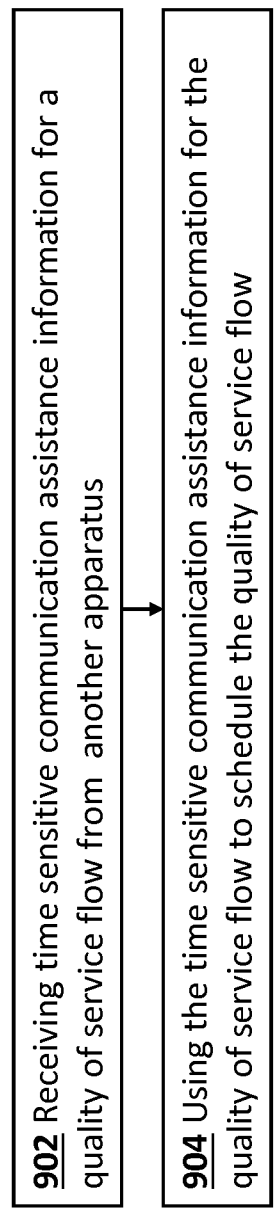
FIG. 9 shows a schematic representation of a method for using time sensitive communication assistance information for a quality of service flow, for example performed by a radio access network apparatus.

FIG. 9 shows a schematic representation of a method for using TSCAI for a QoS flow. The method may be performed by an apparatus such as a RAN apparatus.

In step 902, the apparatus may receive TSCAI for a QoS from another apparatus. The other apparatus may be an SMF apparatus.

In step 904, the apparatus may use the TSCAI for the QoS received in step 902 to schedule the QoS flow.

Figure 10:
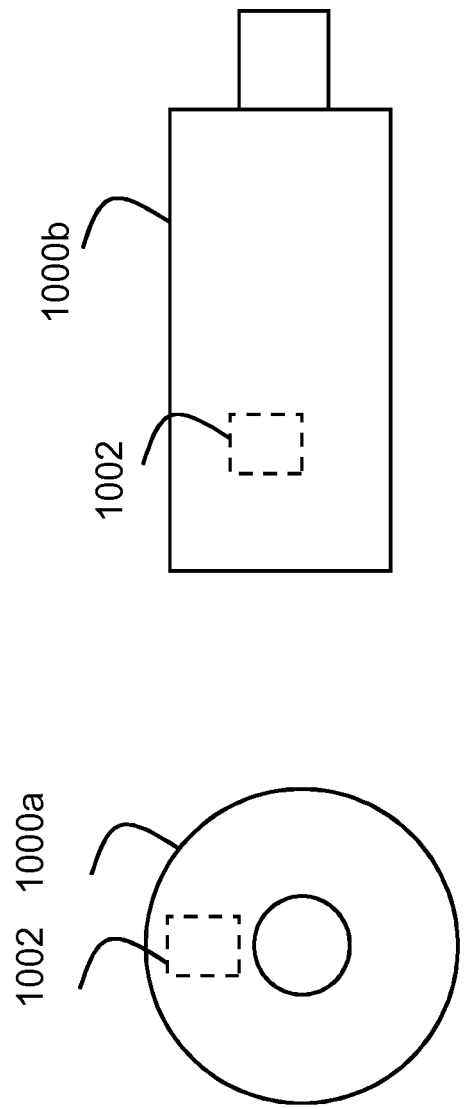
FIG. 10 shows a schematic representation of a non-volatile memory medium storing instructions which when executed by a processor allow a processor to perform one or more of the steps of the above methods.

FIG. 10 shows a schematic representation of non-volatile memory media 1000a (e.g. computer disc (CD) or digital versatile disc (DVD)) and 1000b (e.g. universal serial bus (USB) memory stick) storing instructions and/or parameters 1002 which when executed by a processor allow the processor to perform one or more of the steps of the methods described herein.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures described herein may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory including computer program code;
the at least one memory and the computer program code configured to, with the at least one processor, cause the apparatus at least to:
identify a stream gate instance associated with a quality of service flow by mapping a stream identifier associated with a destination address to a stream gate instance identifier; and
determine time sensitive communication assistance information for the quality of service flow based on one or more parameters defining operation of the stream gate instance.

2. The apparatus of claim 1, wherein the one or more parameters defining operation of the stream gate instance associated with the quality of service flow are stored in a stream filter instance information table.

3. The apparatus of claim 1, wherein the one or more parameters defining operation of the stream gate instance comprise at least one of (i) a parameter defining a sequence with which the stream gate instance is opened and closed and (ii) a parameter defining a periodicity of a cycle of the stream gate instance.

4. The apparatus of claim 3, wherein (i) the parameter defining a sequence with which the stream gate instance is opened and closed comprises OperControlList or AdminControlList.

5. The apparatus of claim 4, wherein (ii) the parameter defining a periodicity of a cycle of the stream gate instance cycle comprises OperCycleTime or AdminCycleTime.

6. The apparatus of claim 1, wherein the time sensitive communication assistance information for the quality of service flow comprises at least one of a flow direction, a periodicity and a burst arrival time.

7. The apparatus of claim 1, wherein identifying a stream gate instance associated with a quality of service flow further comprises:
determining ingress and egress ports of the destination address included in one or more entries of a filtering database table.

8. The apparatus of claim 7, wherein identifying a stream gate instance associated with a quality of service flow further comprises:
determining the stream identifier uniquely identifying a stream associated with the destination address.

9. The apparatus of claim 8, wherein identifying a stream gate instance associated with a quality of service flow further comprises:
mapping the stream identifier to the ingress and egress ports.

10. The apparatus of claim 8, wherein identifying a stream gate instance associated with a quality of service flow further comprises:
identifying the stream gate instance uniquely identified by the stream gate instance identifier and associated with a quality of service flow.

11. The apparatus of claim 8, wherein the stream is a time-sensitive networking stream.

12. The apparatus of claim 1, wherein the apparatus is an application function apparatus, a session management function apparatus or a policy control function apparatus.

13. The apparatus of claim 1, wherein the at least one memory and the computer program code configured to, with the at least one processor, cause the apparatus at least to:
send the time sensitive communication assistance information for the quality of service flow to another apparatus.

14. The apparatus of claim 13, wherein the other apparatus is a session management function apparatus or a radio access network function apparatus.

15. An apparatus comprising:
at least one processor; and
at least one memory including computer program code;
the at least one memory and the computer program code configured to, with the at least one processor, cause the apparatus at least to:
receive time sensitive communication assistance information for a quality of service flow from a first other apparatus, wherein the time sensitive communication assistance information for the quality of service flow is determined based on one or more parameters defining operation of a stream gate instance associated with the quality of service flow, and wherein the one or more parameters comprise at least a parameter defining a periodicity of a cycle of the stream gate instance; and forward the time sensitive communication assistance information for the quality of service flow to a second other apparatus.

16. An apparatus comprising:
at least one processor; and
at least one memory including computer program code;
the at least one memory and the computer program code configured to, with the at least one processor, cause the apparatus at least to:
receive time sensitive communication assistance information for a quality of service flow from another apparatus, wherein the time sensitive communication assistance information for the quality of service flow is determined based on one or more parameters defining operation of a stream gate instance associated with the quality of service flow, and wherein the one or more parameters comprise at least a parameter defining a periodicity of a cycle of the stream gate instance; and
use the time sensitive communication assistance information for the quality of service flow to schedule the quality of service flow.

17. A method comprising:
identifying a stream gate instance associated with a quality of service flow by mapping a stream identifier associated with a destination address to a stream gate instance identifier; and
determining time sensitive communication assistance information for the quality of service flow based on one or more parameters defining operation of the stream gate instance.

18. A method comprising:
receiving time sensitive communication assistance information for a quality of service flow from another apparatus, wherein the time sensitive communication assistance information for the quality of service flow is determined based on one or more parameters defining operation of a stream gate instance associated with the quality of service flow, and wherein the one or more parameters comprise at least a parameter defining a periodicity of a cycle of the stream gate instance; and
using the time sensitive communication assistance information for the quality of service flow to schedule the quality of service flow.

* * * * *